United States Patent [19]
Gotoh et al.

[11] Patent Number: 5,826,960
[45] Date of Patent: Oct. 27, 1998

[54] PROTECTION TYPE DISPLAY DEVICE WITH POLARIZED LIGHT REFLECTING MIRROR AND POLARIZED LIGHT SOURCE

[75] Inventors: Takeshi Gotoh; Tetsuya Kobayashi; Mari Sugawara; Toshihiro Suzuki, all of Kawasaki, Japan

[73] Assignee: Fujitsu Limited, Kawasaki, Japan

[21] Appl. No.: 889,973

[22] Filed: Jul. 10, 1997

[30] Foreign Application Priority Data

Dec. 27, 1996 [JP] Japan ................................ 8-351357

[51] Int. Cl.⁶ .................................................. G03B 21/14
[52] U.S. Cl. .................................................. 353/20; 349/9
[58] Field of Search ............................. 353/20, 8, 31, 353/34, 37, 97; 349/9, 8; 359/487, 495, 496, 497

[56] References Cited

U.S. PATENT DOCUMENTS

| | | | |
|---|---|---|---|
| 5,381,278 | 1/1995 | Shingaki | 353/20 |
| 5,387,953 | 2/1995 | Minoura et al. | 353/20 |
| 5,535,054 | 7/1996 | Shibuya | 359/487 |
| 5,601,351 | 2/1997 | Vandeubrandt | 353/20 |
| 5,626,408 | 5/1997 | Heynderickx et al. | 353/20 |

FOREIGN PATENT DOCUMENTS

| | | |
|---|---|---|
| 651399 | 2/1994 | Japan . |
| 6331950 | 12/1994 | Japan . |
| 772428 | 3/1995 | Japan . |

*Primary Examiner*—William Dowling
*Attorney, Agent, or Firm*—Greer, Burns & Crain, Ltd.

[57] ABSTRACT

A display device includes a reflective type polarizer, a light valve, an analyzer, a mirror, and a polarization rotating film. The polarizer allows a first polarized light to pass therethrough and a second polarized light to be reflected thereby. The second polarized light is then reflected to the polarizer by the mirror, and the vibrating plane of the second polarized light is rotated by the polarization rotating film, so that the second polarized light can pass through the polarizer. The polarizer is inclined to an optical axis of the device. The mirror is arranged near the light source. This principle is also applied to a projection type color display device. In addition, a polarized light source including a lamp, a reflector, a polarizer, a mirror, and a polarization rotating film is disclosed.

25 Claims, 13 Drawing Sheets

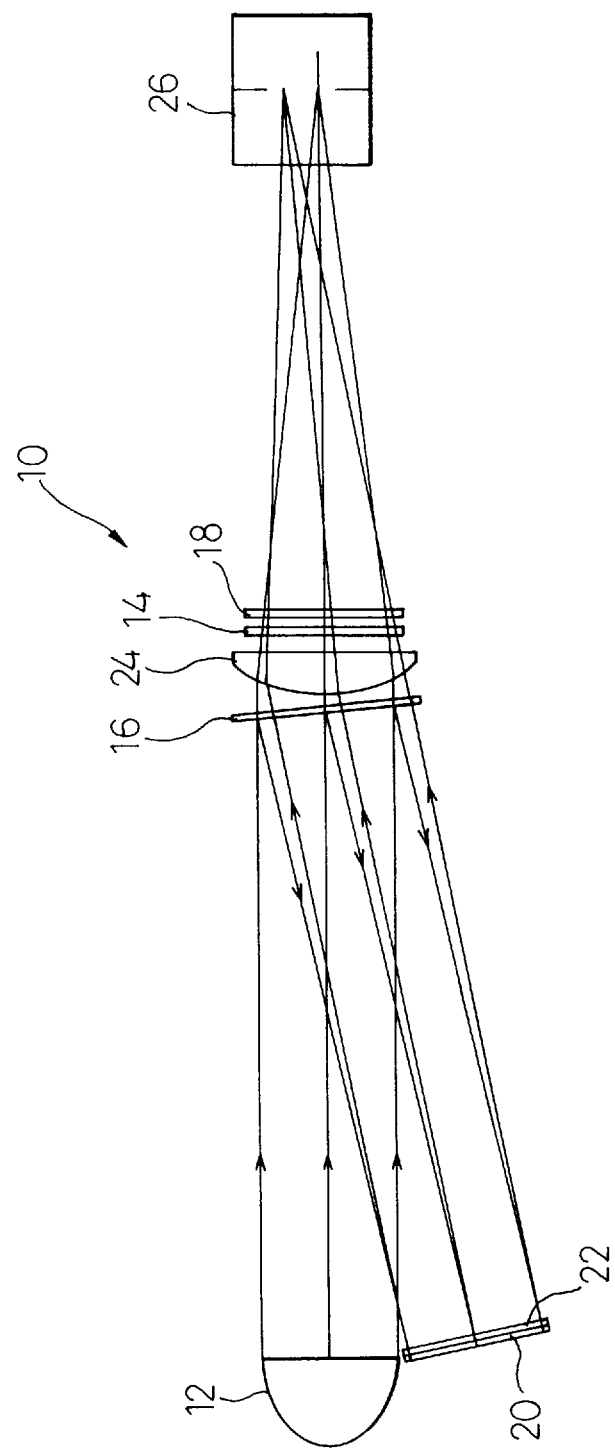

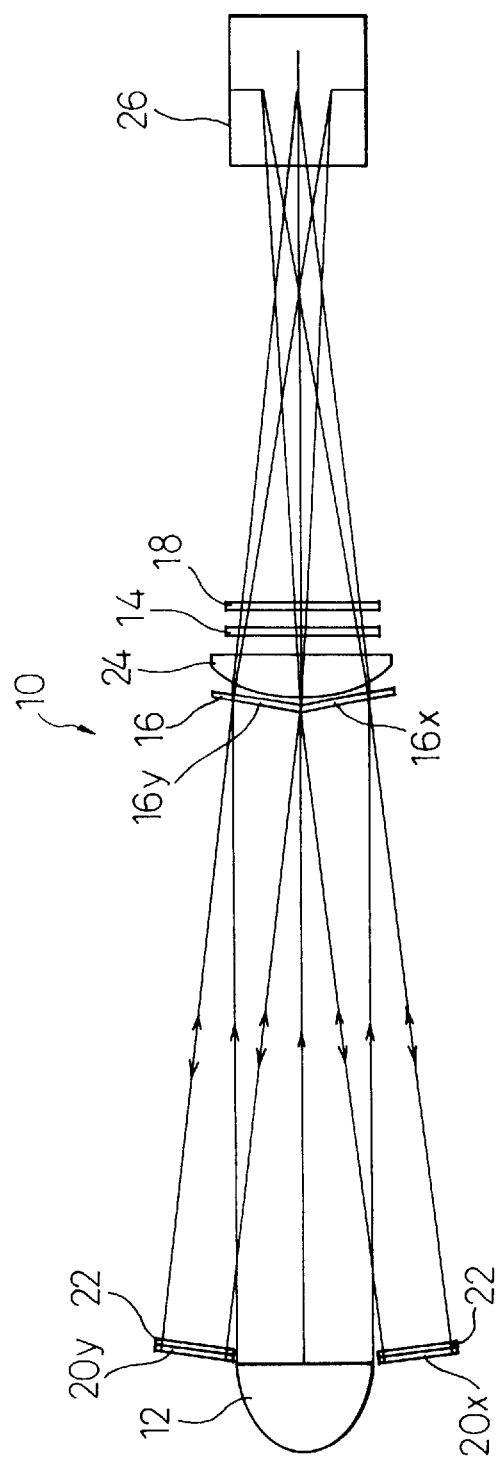
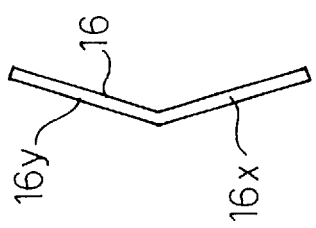

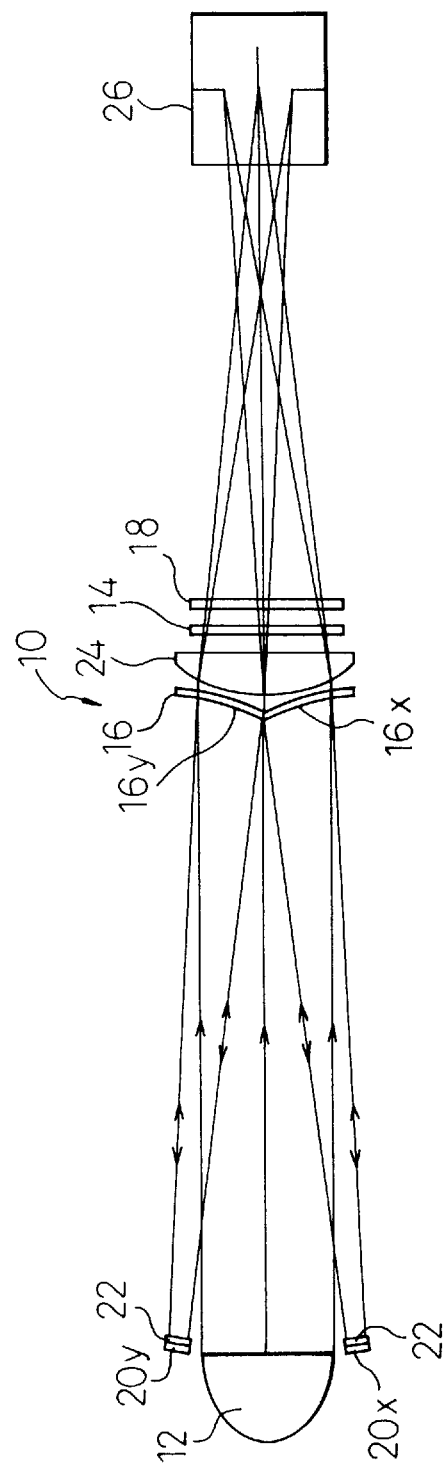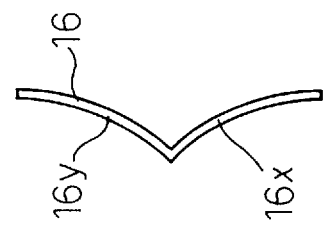

PROTECTION TYPE DISPLAY DEVICE WITH POLARIZED LIGHT REFLECTING MIRROR AND POLARIZED LIGHT SOURCE

BACKGROUND OF THE INVENTION

1. Field of the Invention

The present invention relates to a display device such as a projection type display device and a polarized light source.

2. Description of the Related Art

The projection type display device includes a light source, a liquid crystal panel as a light valve, and a projection lens. The liquid crystal panel usually requires linearly polarized light. For example, when the liquid crystal panel uses a twisted nematic liquid crystal, a polarizer is arranged on the side of the light source from the liquid crystal panel, and an analyzer is arranged on the opposite side of the light source from the liquid crystal panel.

In the twisted nematic liquid crystal display device, an absorbing type polarizer is generally used. The absorbing type polarizer allows a first polarized light in the source light to pass therethrough and the remaining, second polarized light is absorbed therein, whereby only the first polarized light which passes through the polarizer travels to the liquid crystal panel. However, there is a problem in such a liquid crystal display device, that half of the source light is not used so that the efficiency of the available light is low, and the display is not bright.

It is necessary to use a stronger light source to obtain a bright display, but this causes an increase in a power consumption in the display device. In addition, the polarizer is heated by its absorbing action, and it is necessary to strongly cool the polarizer to prevent the polarizer from being deteriorated.

In contrast to the absorbing type polarizer, a reflective type polarizer allows a first polarized light in the source light to pass therethrough and the remaining, second polarized light is reflected thereby. An example of the absorbing type polarizer, formed as a polarizer film, is described in Japanese Unexamined Patent Publication (Kokai) No. 6-51399. In this Publication, only the P-polarized light passing through the polarizer travels to the liquid crystal panel. Also, a polarization beam splitter is an example of the reflective type polarizer.

It is possible to increase the efficiency of the available light if it is possible to use both of the first polarized light passing through the polarization beam splitter and the second polarized light reflected by the polarization beam splitter.

For example, Japanese Unexamined Patent Publication (Kokai) No. 7-72428 discloses a projection type display device including two polarization beam splitters arranged in an inverted V-shape arranged on the optical path passing through the light source. The legs of the inverted V-shape of two polarization beam splitters face the light source and the apex of the inverted V-shape of two polarization beam splitters faces the liquid crystal. A ½ phase plate is arranged on the center line of two polarization beam splitters, and two mirrors are arranged outside two polarization beam splitters adjacent to the latter. The first polarized light in the source light (for example, P-polarized light) passes through two polarization beam splitters and travels to the liquid crystal panel. The remaining, second polarized light in the source light (for example, S-polarized light) is reflected by two polarization beam splitters, respectively, passes through the ½ phase plate to be converted into the other polarized light (P-polarized light), and then passes through two polarization beam splitters. This polarized light is then reflected by the mirrors and travels to the liquid crystal. Therefore, it is possible to use almost all of the source light.

However, in this prior art, two mirrors laterally extend to great extent beyond the cross-sectional area of the optical path defined by two polarization beam splitters, so the size of the display device is greatly increased, since two polarization beam splitters are arranged such that the incident angle of the light to two polarization beam splitters is 45 degrees, and two mirrors are arranged outside two polarization beam splitters adjacent to the latter, each mirror having a size generally identical to that of the polarization beam splitter. In addition, the polarized light traveling from the mirrors to the liquid crystal panel is made incident to the liquid crystal display device at a relatively large incident angle, and thus it is possible for the polarized light to pass through the liquid crystal panel, but it is difficult for the polarized light passing through the liquid crystal panel to pass through the projection lens.

Further, in the case of the liquid crystal color display device, the display device must include three sets of color separating and polarization separating devices, with each set of polarization separating device including the above described two polarization beam splitters and two mirrors, so the size of the display device must be further increased.

SUMMARY OF THE INVENTION

The object of the present invention is to provide a display device by which the efficiency of the available polarized light is high and the size of the display device is small.

Another object of the present invention is to provide a polarized light source by which a parallel distributed polarized light is provided.

According to the present invention, there is provided a display device comprising a light source, a light valve, a polarizer arranged between the light source and the light valve, the polarizer allowing a first polarized light to pass therethrough and a second polarized light to be reflected thereby, and an analyzer arranged to receive a light passing through the light valve. At least one mirror is arranged such that the second polarized light reflected by the polarizer is reflected to the polarizer by the at least one mirror. A polarization rotating element is arranged between the polarizer and the at least one mirror. The polarizer is inclined to an optical axis passing through the light source and the light valve so that an angle between a light beam traveling from the light source to the polarizer and a light beam traveling from the polarizer to the at least one mirror is smaller than 90 degrees. The at least one mirror is arranged on the side of the light source away from the plane of the polarizer. Therefore, the first polarized light emitting from the light source to the polarizer can pass through the polarizer, and the second polarized light emitting from the light source and reflected by the polarizer is reflected by the at least one mirror to the polarizer, has a vibrating plane rotated by the polarization rotating element and can pass through the polarizer.

In this arrangement, a portion of the source light, i.e., the first polarized light, can pass through the polarizer and reaches the light valve. Another portion of the source light, i.e., the second polarized light which is initially reflected by the polarizer, is reflected by the at least one mirror to the polarizer, and a vibrating plane thereof is rotated, by 90 degrees, by the polarization rotating element and can also pass through the polarizer. Therefore, almost all the source light is made incident to the light valve, so the efficiency of the projector increases. In addition, an incident angle of the polarized light which initially passes through the polarizer to the light valve is not so much different from an incident angle of the polarized light which is initially reflected by the polarizer and then passes through the polarizer after reflected by the mirror to the light valve. Therefore, it is not difficult for these polarized lights to pass through a projection lens in the case of a projection type display device.

In addition, the mirror is arranged on the side of the light source from a plane which is perpendicular to an optical axis of the light traveling from the polarizer, the mirror being preferably arranged near the light source. There is usually a free space near the light source in the display device, so it is not necessary to increase the size of the display space very much. In addition, in the case of a color display device, the display device must include three sets of color separating and polarization separating devices, but a common mirror can be used for three sets of polarization separating devices, as will be described later, so it is not necessary to increase the size of the display space very much.

Preferably, the display device further comprises a projection lens. Preferably, the light valve comprises a liquid crystal panel. That is, the display device is a projection type liquid crystal display device.

Preferably, the at least one mirror is arranged such that the polarized light reflected by the polarizer is made incident approximately perpendicular to the at least one mirror.

Preferably, the at least one mirror is arranged at a position outside a path of the light travelling from the light source to the polarizer and adjacent to the light source.

Preferably, the at least one mirror is arranged at a position within a path of the light travelling from the light source to the polarizer.

Preferably, the polarizer has a flat reflecting surface, or a curved reflecting surface. In the latter case, the curved reflecting surface of the polarizer comprises a convex surface, viewed from the side of the light source, or a concave surface, viewed from the side of the light source. The curved reflecting surface of the polarizer comprises first and second portions arranged symmetrically with respect a central point of the curved reflecting surface or with respect to a line passing through the central point, and the at least one mirror comprises two mirrors corresponding to the first and second portions.

Preferably, the display device further comprises a lens causing the light travelling from the polarizer to the at least one mirror to converge. Or, the display device further comprises a lens causing the light travelling from the polarizer to the at least one mirror to converge and causing the light travelling passing through the polarizer to the projection lens to converge. Or, the display device further comprises a first lens causing the light travelling from the polarizer to the at least one mirror to converge and a second lens causing the light travelling passing through the polarizer to the projection lens to converge.

Preferably, the display device further comprises a further polarizer arranged between the polarizer and the light valve for permitting a polarized light having the same vibrating direction as that of the polarized light passing through the first polarizer to pass through the further polarizer and causing a polarized light having a vibrating direction perpendicular to that of the polarized light passing through the first polarizer to be reflected by the further polarizer.

Preferably, the polarizer comprising one of a first film comprising a laminated structure of a film having selective reflectivity of a circular polarized light and phase films converting a right or left rotating circular polarized light into a linear polarized light, and a second film comprising films having small prisms on the surfaces thereof and a thin film having different indices of refraction and laminated on the respective surfaces of each prism.

Preferably, the polarizer is adhered to a glass plate and the glass plate is arranged to face the light source. Preferably, the polarization rotating element is adhered to the reverse surface of the glass plate. Preferably, the polarization rotating element is adhered to the at least one mirror.

Preferably, the at least one mirror comprises one mirror, and the projection lens has an optical axis which is offset relative to the optical axis passing through the light source and the light valve on the opposite side of the mirror.

According to another aspect of the present invention, there is provided a projection type display device comprising: a light source; a plurality of light valves; a plurality of polarizers arranged between the light source and the respective light valves, each of the polarizers allowing a first polarized light to pass therethrough and a second polarized light to be reflected thereby; a plurality of analyzers arranged to receive a light passing through the respective light valves; at least one mirror arranged such that the second polarized light reflected by the plurality of polarizers is reflected to the original polarizers by the at least one mirror; at least one polarization rotating element arranged between the polarizers and the at least one mirror, the number of the at least one polarization rotating element being identical to that of the at least one mirror; a projection lens; the polarizers being inclined to an optical axis passing through the light source and the light valves so that an angle between a light beam traveling from the light source to the polarizers and a light beam traveling from the polarizers to the at least one mirror is smaller than 90 degrees; and the at least one mirror is arranged near the light source, whereby the first polarized light emitting from the light source to the polarizers can pass through the polarizers, and the second polarized light emitting from the light source to the polarizers and reflected by the polarizers is reflected by the at least one mirror to the polarizers, has a vibrating plane rotated by the at least one polarization rotating element and can pass through the polarizers.

In this arrangement, the at least one mirror is arranged near the light source and is common for all the light valves, as described above.

According to a further aspect of the present invention, there is provided a polarized light source comprising: an elliptic reflector having two focal points; a lamp arranged at one of the focal points of the elliptic reflector; a pin-hole plate having a pin-hole and arranged at the other of the focal points of the elliptic reflector; a field lens having a focal point at the other focal point of the elliptic reflector; a polarizer arranged on the light emerging side of the field lens and inclined to an optical axis determined by the elliptic reflector and the pin-hole plate, the polarizer allowing a first polarized light to pass therethrough and a second polarized light to be reflected thereby; a mirror arranged between the field lens and the pin-hole plate at a position near the pin-hole; and a polarization rotating element arranged between the mirror and the polarizer.

According to a further aspect of the present invention, there is provided a polarized light source comprising: a spherical reflector having a focal point; a lamp arranged at the focal point of the spherical reflector; a field lens having a focal point at a position of the lamp; a polarizer arranged on the light emerging side of the field lens and inclined to an optical axis determined by the lamp and the field lens, the polarizer allowing a first polarized light to pass therethrough and a second polarized light to be reflected thereby; a mirror arranged at a position near the lamp; and a polarization rotating element arranged between the mirror and the polarizer.

According to a further aspect of the present invention, there is provided a polarized light source comprising: a parabolic reflector having a focal point; a lamp arranged at the focal point of the parabolic reflector; a condenser lens; a polarizer arranged on the light emerging side of the condenser lens and vertical to an optical axis determined by the lamp and the condenser lens, the polarizer allowing a first polarized light to pass therethrough and a second polarized light to be reflected thereby; a mirror arranged between the lamp and the condenser lens on the optical axis; and a polarization rotating element arranged between the mirror and the polarizer.

It is possible to construct a projection type display device using the above described polarized light source.

BRIEF DESCRIPTION OF THE DRAWINGS

The present invention will become more apparent from the following description of the preferred embodiments, with reference to the accompanying drawings, in which:

FIG. 1 is a diagrammatic view of a display device according to the first embodiment of the present invention;

FIG. 2A is a diagrammatic view of a modified example of the display device;

FIG. 2B is a view of the mirror of FIG. 2A;

FIG. 3A is a diagrammatic view of another modified example of the display device;

FIG. 3B is a view of the mirror of FIG. 3A;

DESCRIPTION OF THE PREFERRED EMBODIMENTS

Figure 4:
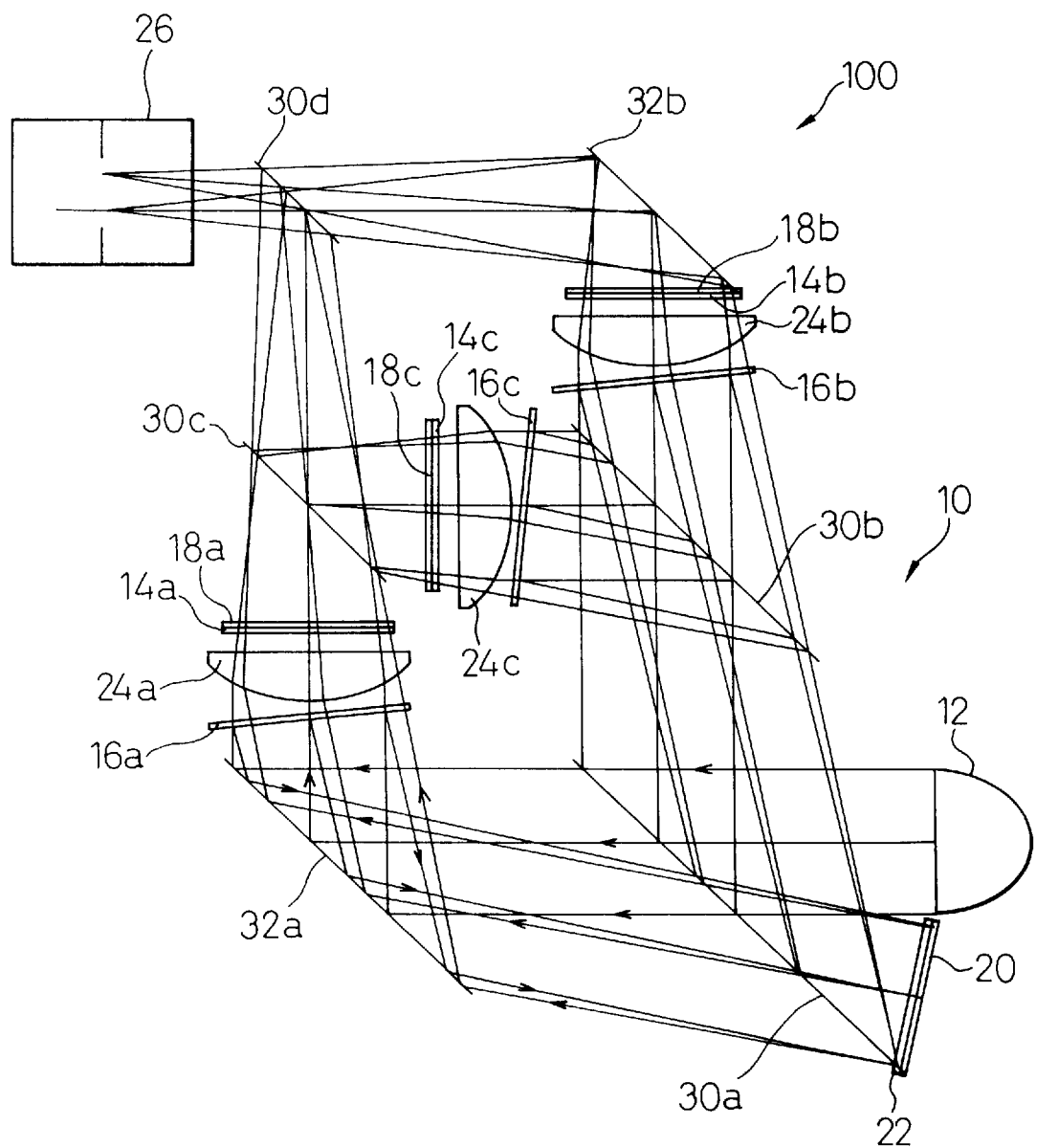
FIG. 4 is a diagrammatic view of a projection type color display device, using the principle of the display device of FIG. 1.

FIG. 1 shows a display device 10 according to the first embodiment of the present invention. The display device 10 comprises a light source 12, a liquid crystal panel 14 as a light valve, a reflective type polarizer 16 arranged between the light source 12 and the liquid crystal panel 14, an analyzer 18 arranged to receive a light passing through the liquid crystal panel 14, a mirror 20 arranged to reflect the polarized light reflected by the polarizer 16, and a polarization rotating film 22. The display device 10 of FIG. 1 is constructed as a projection type display device and includes a condenser lens 24 and a projection lens 26.

The light source 12 includes a lamp providing a very strong light, such as a metal halide lamp, a halogen lamp, or a xenon lamp, and a reflector. The liquid crystal panel 14 comprises a twisted nematic type liquid crystal inserted between a pair of transparent glass plates.

The reflective type polarizer 16 allows a first polarized light having a first vibrating direction or plane to pass therethrough and a second polarized light having a second vibrating direction or plane perpendicular to the first vibrating direction or plane to be reflected thereby. Such a polarizer 16 can be formed by a polarization beam splitter or a polarizer film. When a polarizer film is used, it is adhered to a glass plate. The polarizer 16 of FIG. 1 has a flat reflecting surface.

The polarization rotating film 22 is formed by a $\lambda/4$ phase plate having an optical axis arranged at 45 degrees relative to the vibrating direction of the polarized light which is reflected by the polarizer 16, so that the vibrating direction of the polarized light rotates with 90 degrees while the polarized light travels from the polarizer 16 to the mirror 20 and from the mirror 20 to the polarizer 16. Therefore, the second polarized light reflected by the polarizer 16 and the mirror 20 is again made incident to the polarizer 16 with the vibrating direction of the polarized light rotated by 90 degrees, and thus can pass through the polarizer 16. Therefore, the first polarized light can pass through the polarizer 16 to the liquid crystal panel 14, and the second polarized light which is initially reflected by the polarizer 16 can also pass through the polarizer 16 to the liquid crystal panel 14. Accordingly, it is possible to obtain a liquid crystal display device in which the light efficiency is high.

The polarizer 16 is inclined to an optical axis passing through the light source 12 and the liquid crystal panel 14 so that an angle between an incident light beam traveling from the light source 12 to the polarizer 16 and a reflected light beam traveling from the polarizer 16 to the mirror 20 is smaller than 90 degrees. In the preferred embodiment, the angle between an incident light beam traveling from the light source 12 to the polarizer 16 and a reflected light beam traveling from the polarizer 16 to the mirror 20 is approximately 10 degrees. The mirror 20 is arranged on the side of the light source 12 from a plane which is perpendicular to an optical axis of the light traveling from the polarizer 16 to the mirror 20 and passes through the center of the polarizer 16, so that a polarized light reflected by the polarizer 16 at a certain position thereof and by the mirror 20 is made again incident to the polarizer 16 at a position as close as to the position at which the light is initially made incident to the polarizer 16.

Preferably, the mirror 20 is arranged such that the polarized light reflected by the polarizer 16 is made incident approximately perpendicular to the mirror 20. Therefore, a polarized light reflected by the polarizer 16 at a certain position thereof and by the mirror 20 is again made incident to the polarizer 16 at the same position as the position at which the light is initially made incident to the polarizer 16. However, a portion of the polarized light that initially passes through the polarizer 16 travels substantially parallel to the optical axis, but another portion of the polarized light which is initially reflected by the polarizer 16 and again reflected by the mirror 20 and passes through the polarizer 16 is inclined relative to the optical axis to some degree. This inclination angle of the polarized light depends on the inclination angle of the polarizer 16, so it is preferable that the inclination angle of the polarizer 16 is as small as possible.

Therefore, it is preferable that the mirror 20 is arranged at a position outside a path of the light travelling from the light source 12 to the polarizer 16 and adjacent to the light source 12. By arranging the mirror in this manner, it is possible to reduce the inclination angle of the polarizer 16 as much as possible, without a possibility that the light travelling from the light source 12 to the polarizer 16 is disturbed by the mirror 20. Since, in many cases, a space is included in the display device 10 near the light source 12, it is possible to arrange the mirror 20 without the need for enlarging the display device.

FIGS. 2A and 2B show a display device 10 according to the second embodiment of the present invention. In this embodiment too, the display device 10 includes a light source 12, a liquid crystal panel 14, a reflective type polarizer 16, an analyzer 18, mirrors 20x and 20y arranged to reflect the polarized light reflected by the polarizer 16, polarization rotating films 22, a condenser lens 24, and a projection lens 26.

In this embodiment, the polarizer 16 has a curved reflecting surface, i.e., a convex surface, viewed from the side of the light source 12, and includes first and second portions 16x and 16y arranged symmetrically with respect a central point of the convex reflecting surface. Each of the first and second portions 16x and 16y is flat. Two mirrors 20x and 20y are arranged on either side of the light source 12 corresponding to the first and second portions 16x and 16y of the polarizer 16. The polarization rotating films 22 are adhered to the respective mirrors 20x and 20y. In the embodiment, the reflecting surface of the polarizer 16 is divided into two portions 16x and 16y, but it will be understood that it is not necessary to divide the reflecting surface of the polarizer 16 into two portions and it is possible to divide the reflecting surface of the polarizer 16 into any number of portions.

The fundamental operation of this embodiment is similar to that of the previous embodiment. That is, a first polarized light coming from the light source 12 passes through the polarizer 16 to the liquid crystal panel 14. Another portion of polarized light coming from the light source 12 is reflected by the first and second portions 16x and 16y of the polarizer 16 and by the respective mirrors 20x and 20y with the vibrating direction of the polarized light rotated by 90 degrees by the polarization rotating films 22, and passes through the polarizer 16 to the liquid crystal panel 14.

FIGS. 3A and 3B show a display device 10 according to the third embodiment of the present invention. In this embodiment too, the display device 10 includes a light source 12, a liquid crystal panel 14, a reflective type polarizer 16, an analyzer 18, mirrors 20x and 20y arranged to reflect the polarized light reflected by the polarizer 16, polarization rotating films 22, a condenser lens 24, and a projection lens 26.

In this embodiment, the polarizer 16 has a curved reflecting surface, i.e., a convex surface, viewed from the side of the light source 12, and includes first and second portions 16x and 16y arranged symmetrically with respect a central point of the convex reflecting surface. Two mirrors 20x and 20y are arranged on either side of the light source 12 corresponding to the first and second portions 16x and 16y of the polarizer 16. Each of the first and second portions 16x and 16y is concave, viewed from the side of the light source 12. Therefore, the light beams reflected by the first and second portions 16x and 16y of the polarizer 16 become convergent light beams toward the mirrors 20x and 20y.

The fundamental operation of this embodiment is similar to that of the previous embodiment. That is, a first polarized light coming from the light source 12 passes through the polarizer 16 to the liquid crystal panel 14. Another portion of polarized light coming from the light source 12 is reflected by the first and second portions 16x and 16y of the polarizer 16 and by the respective mirrors 20x and 20y with the vibrating direction of the polarized light rotated with 90 degrees by the polarization rotating films 22, and passes through the polarizer 16 to the liquid crystal panel 14. Since the light beams reflected by the first and second portions 16x and 16y of the polarizer 16 become convergent light beams toward the mirrors 20x and 20y, it is possible to design the mirrors 20x and 20y in a smaller size compared with the polarizer 16, so it is not necessary to enlarge the display device so much.

FIGS. 4 shows a projection type color display device 100, using the principle of the display device 10 of FIG. 1. The projection type color display device 100 includes three sets of liquid crystal panels 14a, 14b and 14c, polarizers 16a, 16b and 16c, analyzers 18a, 18b and 18c, and condenser lenses 24a, 24b and 24c for blue, green and red colors.

Dichroic mirrors 30a, 30b and 30c are arranged. Dichroic mirrors 30a, 30b and 30c can separate colors and combine colors by allowing a light component of a particular color to pass therethrough and allowing the remaining light component to be reflected thereby. In addition, totally reflective mirrors 32a and 32b are arranged.

A single mirror 20 is arranged adjacent to the light source 12. The mirror 20 is common to three polarizers 16a, 16b and 16c. A polarization rotating film 22 is adhered to the mirror 20. Also, a projection lens 26 is arranged. Therefore, it is possible to use a fundamental arrangement of a conventional projection type color display device, by only securing a space for the mirror 20.

The principle of the embodiment of FIG. 1 is applied to each set of liquid crystal panels 14a, 14b and 14c and polarizers 16a, 16b and 16c, the mirror 20 and the polarization rotating film 22. That is, each of the polarizers 16a, 16b and 16c is inclined to the optical axis passing through the light source 12 and each of liquid crystal panels 14a, 14b and 14c. Regarding the set of the liquid crystal panel 14a and the polarizer 16a, the light coming from the light source 12 passes through the dichroic mirror 30a and reflected to the polarizer 16a by the totally reflecting mirror 32a to the polarizer 16a. A portion of polarized light can pass through the polarizer 16a to the liquid crystal panel 14a. Another portion of polarized light is reflected by the polarizer 16a, and reflected by the totally reflecting mirror 32a to the mirror 20. The vibrating direction of the polarized light reflected by the mirror 20 is rotated by the polarization rotating film 22 with 90 degrees and the polarized light is made again incident to the polarizer 16a. This polarized light can pass through the polarizer 16a to the liquid crystal panel 14a. Therefore, all the red polarized light, for example, can pass through the polarizer 16a, is image-modulated by the liquid crystal panel 14a, is combined with other color polarized lights by the dichroic mirrors 30c and 30d, and is projected to the screen (not shown) by the projection lens 26.

Regarding the set of the liquid crystal panel 14b and the polarizer 16b, the light coming from the light source 12 is reflected by the dichroic mirror 30a and passes through the dichroic mirror 30b to the polarizer 16b. A portion of polarized light can pass through the polarizer 16b to the liquid crystal panel 14b. Another portion of polarized light is reflected by the polarizer 16b, and reflected by the dichroic mirror 30a to the mirror 20. The vibrating direction of the polarized light reflected by the mirror 20 is rotated by the polarization rotating film 22 with 90 degrees and the polarized light is made again incident to the polarizer 16b. This polarized light can pass through the polarizer 16b to the liquid crystal panel 14b. Therefore, all the blue polarized light, for example, can can pass through the polarizer 16b, is image-modulated by the liquid crystal panel 14b, is reflected by the totally reflecting mirror 32b, is combined with other color polarized lights by the dichroic mirror 30d, and is projected to the screen (not shown) by the projection lens 26.

Regarding the set of the liquid crystal panel 14c and the polarizer 16c, the light coming from the light source 12 is reflected by the dichroic mirror 30a and reflected by the dichroic mirror 30b to the polarizer 16c. A portion of polarized light can pass through the polarizer 16c to the liquid crystal panel 14b. Another portion of polarized light is reflected by the polarizer 16c, and reflected by the dichroic mirrors 30b and 30a to the mirror 20. The vibrating direction of the polarized light reflected by the mirror 20 is rotated by the polarization rotating film 22 with 90 degrees and the polarized light is made again incident to the polarizer 16c. This polarized light can pass through the polarizer 16c to the liquid crystal panel 14b. Therefore, all the green polarized light, for example, can can pass through the polarizer 16c, is image-modulated by the liquid crystal panel 14c, is combined with other color polarized lights by the dichroic mirrors 30c and 30d, and is projected to the screen (not shown) by the projection lens 26.

The display device 10 is designed such that the optical length from the light source 12 to the polarizer 16a, the optical length from the light source 12 to the polarizer 16b, and the optical length from the light source 12 to the polarizer 16c are all identical to each other. Also, the display device 10 is designed such that the optical length from the polarizer 16a to the mirror 20, the optical length from the polarizer 16b to the mirror 20, and the optical length from the polarizer 16c to the mirror 20 are all identical to each other. The latter arrangement is achieved by designing such that the size of the dichroic mirror 30b includes the optical path area of the light source 12 and the optical path area of the mirror 20.

Figure 5:
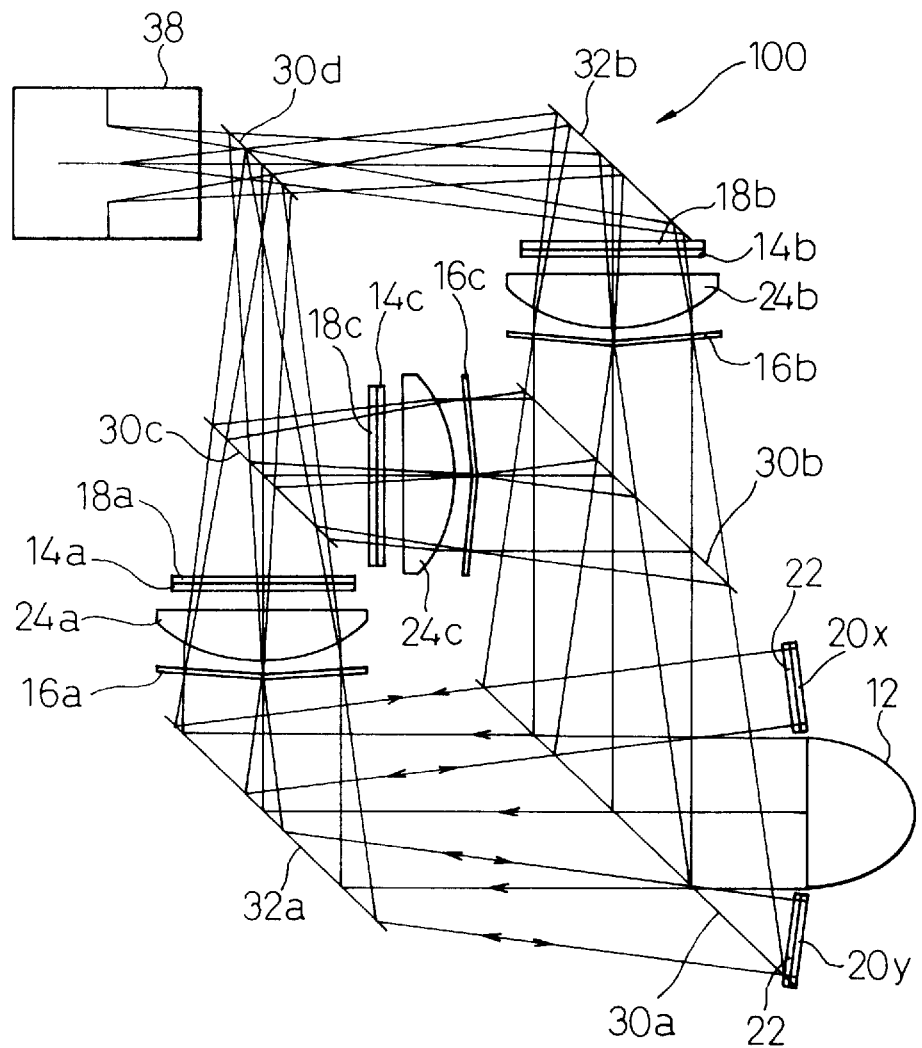
FIG. 5 is a diagrammatic view of a projection type color display device, using the principle of the display device of FIG. 2.

FIG. 5 shows a projection type color display device 100, using the principle of the display device 10 of FIG. 2. The projection type color display device 100 is similar to that shown in FIG. 4, except that each of the polarizers 16a, 16b and 16c is curved, two mirrors 20x and 20y are arranged, and the polarization rotating films 22 are adhered to the respective mirrors 20x and 20y, such features being described with reference to FIG. 2.

Figure 6:
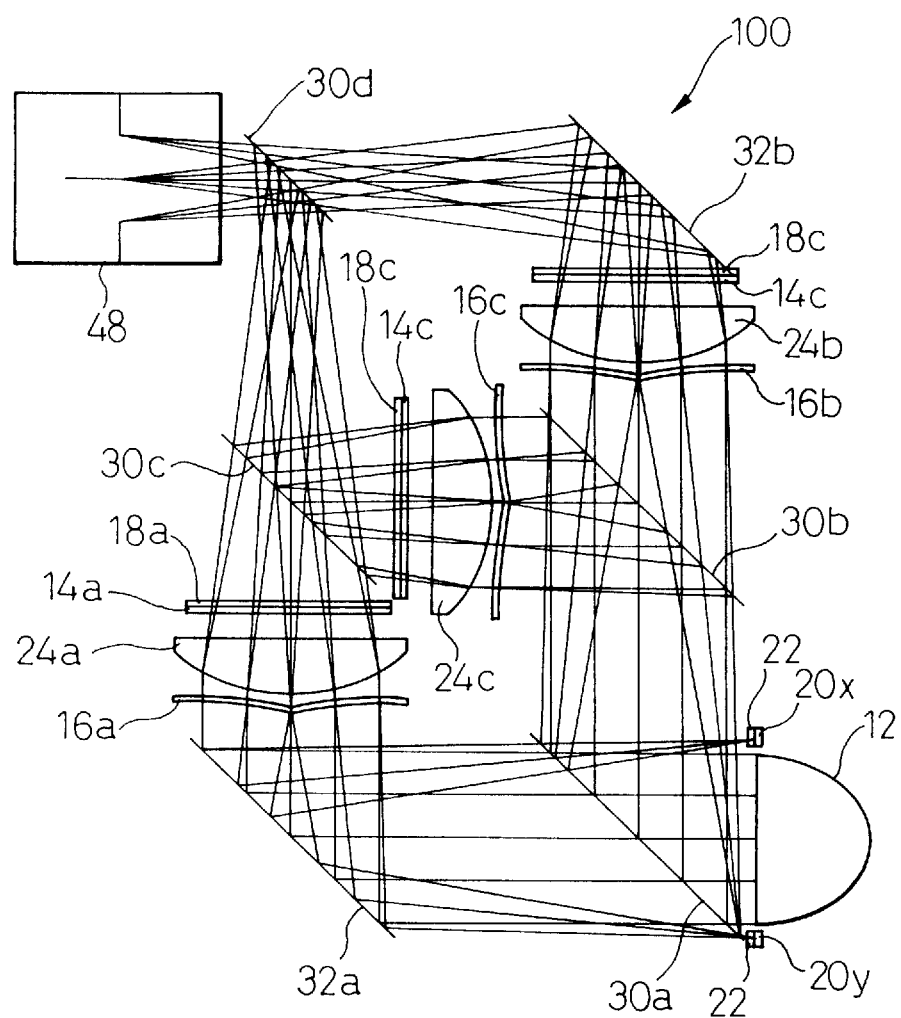
FIG. 6 is a diagrammatic view of a projection type color display device, using the principle of the display device of FIG. 3.

FIG. 6 shows a projection type color display device 100, using the principle of the display device 10 of FIG. 3. The projection type color display device 100 is similar to that shown in FIG. 4, except that each of the polarizers 16a, 16b and 16c is curved, two mirrors 20x and 20y are arranged, and the polarization rotating films 22 are adhered to the respective mirrors 20x and 20y, such features being described with reference to FIG. 3.

In the embodiment of FIG. 3, the polarizer 16 has a convex reflecting surface, viewed from the side of the light source 12, and includes first and second portions 16x and 16y. Each of the first and second portions 16x and 16y is concave, viewed from the side of the light source 12, so the light beams reflected by the first and second portions 16x and 16y of the polarizer 16 become convergent light beams toward the mirrors 20x and 20y, as described previously. This is also applied to the embodiment of FIG. 6.

Figure 7:
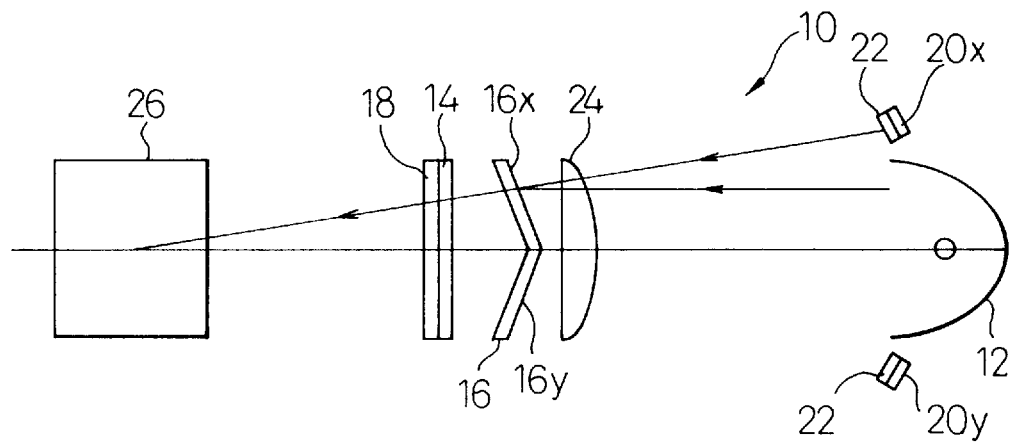
FIG. 7 is a diagrammatic view of a display device according to another embodiment of the present invention.
Figure 8:
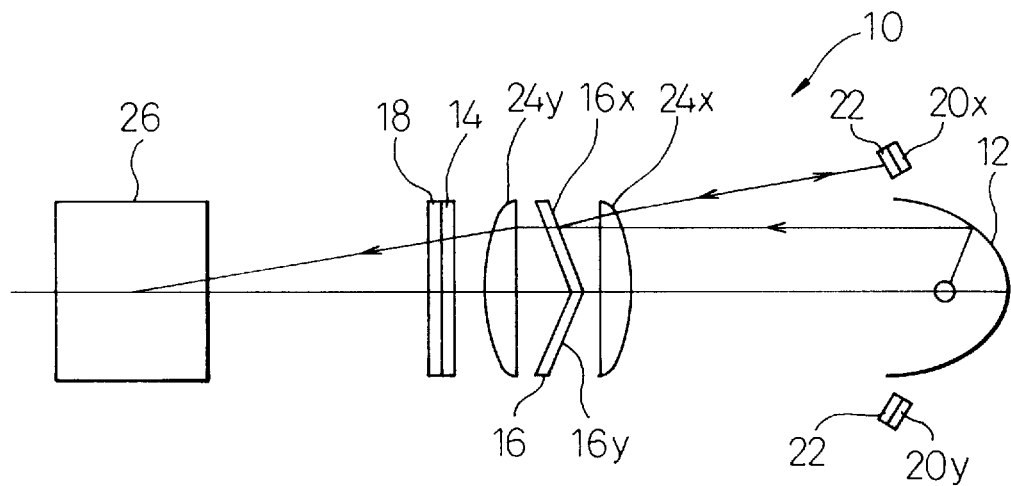
FIG. 8 is a diagrammatic view of a display device according to a further embodiment of the present invention.

In the embodiments of FIGS. 7 and 8, the polarizer 16 has a convex reflecting surface, viewed from the side of the light source 12, and includes first and second portions 16x and 16y. Each of the first and second portions 16x and 16y is flat. A lens is arranged to make the light beams travelling from the first and second portions 16x and 16y to the mirrors 20x and 20y convergent.

In FIG. 7, the condenser lens 24 is arranged on the side of the mirror 12 from the polarizer 16, so the condenser lens 24 makes the light beams travelling from the polarizer 16 to the mirrors 20x and 20y convergent, and also makes the light beams travelling from the first and second portions 16x and 16y of the polarizer 16 to the projection lens 26 convergent. However, since the light beams which are reflected by the first and second portions 16x and 16y of the polarizer 16 and by the mirror 20 pass twice through the condenser lens 24, they have a focal point which is different from that of the light beam which initially passes through the polarizer 16. Therefore, this arrangement is useful when the length between the light source 12 and the polarizer 16 is shorter than the length between the polarizer 16 and the projection lens 26.

In FIG. 8, the condenser lens 24 is constituted by two condenser lenses 24x and 24y. The first condenser lens 24x is arranged on the side of the mirror 12 from the polarizer 16, and the central portion of the first condenser lens 24x is relatively flat to act mainly so that the light beams travelling from the first and second portions 16x and 16y to the mirrors 20x and 20y is made convergent. The second condenser lens 24y is arranged between the polarizer 16 and the liquid crystal panel 14 to act mainly so that the light beams passing through the polarizer 16 is made convergent.

In this arrangement, it is possible to compensate for the difference between the condensing point of the light which passes through the first condenser lens 24x once and the condensing point of the light which passes through the first condenser lens 24x twice.

In addition, in the arrangement of FIG. 8, the polarizer 16 can be a flat polarizer like that as shown in FIG. 1. In this case, it is possible to arrange such that the first condenser lens 24x is of a divided type (having two focal points at upper and lower portions, or at left and right portions) to lead the light reflected by the polarizer 16 to the mirror 20. In the case if a dark region appears between the divided portions of the first condenser lens 24x, it is possible to form the first condenser lens 24x as a Fresnel lens.

FIGS. 9 to 23 show other embodiments.

Figure 9:
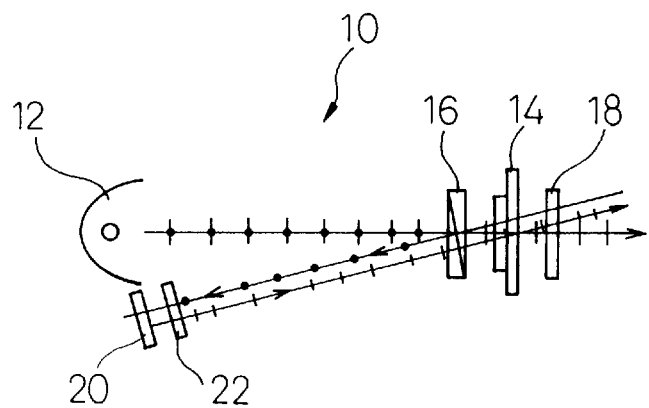
FIG. 9 is a diagrammatic view of a display device according to a further embodiment of the present invention.

In FIG. 9, the display device 10 comprises a light source 12, a liquid crystal panel 14, a polarizer 16, an analyzer 18, a mirror 20 arranged to reflect the polarized light reflected by the polarizer 16, and a polarization rotating film 22. The polarizer 16 can be formed by a polarization beam splitter comprising thin films laminated on a glass plate and having different indices of refraction such as $SiO_2$ and $Al_2O_3$, or a polarization beam splitter comprising the combination of crystals having different indices of refraction.

Figure 10:
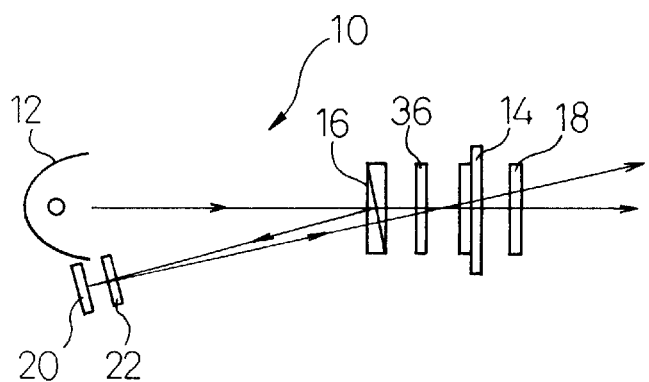
FIG. 10 is a diagrammatic view of a display device according to a further embodiment of the present invention.

In FIG. 10, the display device 10 comprises a light source 12, a liquid crystal panel 14, a polarizer 16, an analyzer 18, a mirror 20 arranged to reflect the polarized light reflected by the polarizer 16, and a polarization rotating film 22. The condenser lens 24 and the projection lens 26 are not shown here. In addition, a further polarizer 36 is arranged between the polarizer 16 and the liquid crystal panel 14 for permitting the polarized light having the same vibrating direction as that of the polarized light passing through the polarizer 16 to pass through the further polarizer 36 and causing the polarized light having a vibrating direction perpendicular to that of the polarized light passing through the polarizer 16 to be reflected by the further polarizer 36. When the polarization separating characteristics is not so sharp, a polarized light having a vibrating direction other than the predetermined vibrating direction may pass through the polarizer 16, and in such a case, the further polarizer 36 absorbs a polarized light having an undesirable vibrating direction and allows to the polarized light having the desirable vibrating direction to pass therethrough.

Figure 11:
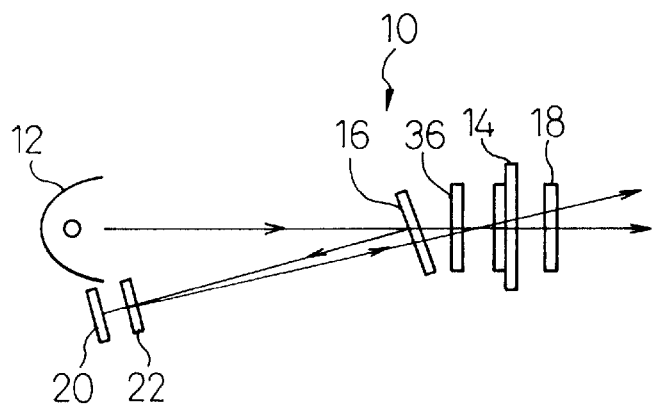
FIG. 11 is a diagrammatic view of a display device according to a further embodiment of the present invention.

FIG. 11 shows the display device similar to that in FIG. 10. However, in FIG. 11, the polarizer 16 comprises a film type polarizer.

Figure 12:
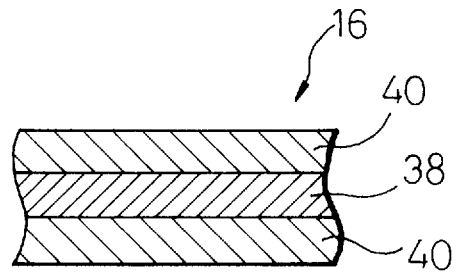
FIG. 12 is a diagrammatic view of an example of the film type polarizer of FIG. 11.

FIG. 12 shows an example of the film type polarizer 16. The film type polarizer 16 comprises a film comprising a laminated structure of a film 38 having selective reflectivity according to a rotating direction of a circular polarized light, which is the optical characteristics of a cholesteric phase of a liquid crystal, and λ/4 phase films 40 converting a right or left rotating circular polarized light into a linear polarized light.

Figure 13:
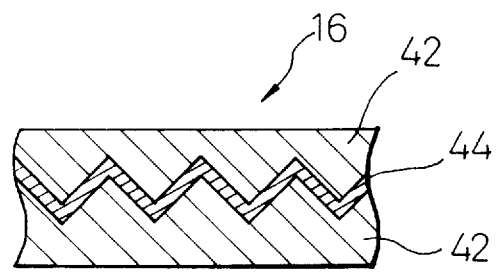
FIG. 13 is a diagrammatic view of another example of the film type polarizer.

FIG. 13 shows another example of the film type polarizer 16. The film type polarizer 16 comprises a film comprising films 42 such as acryl or polycarbonate films having small prisms on the surfaces thereof and a thin film 44 (for example, a film of $SiO_2$, $TiO_2$, MgF) having different indices of refraction and laminated between the films 42 with portions having different indices of refraction on the respective sides of each prism. The film type polarizer 16 makes it possible to reduce a space in which the polarizer 16 is to be arranged, and contributes to a reduction in the size of the optical system and the weight of the device.

Figure 14:
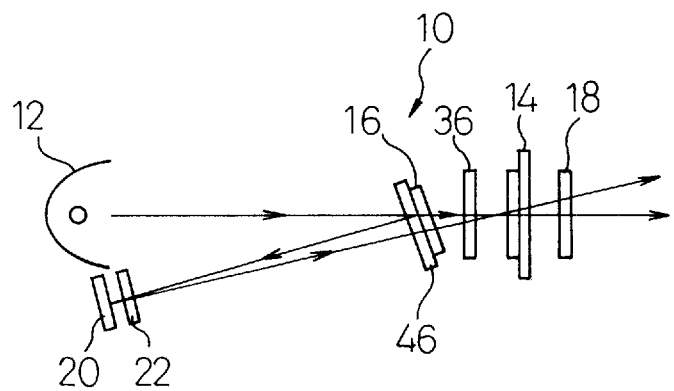
FIG. 14 is a diagrammatic view of a display device according to a further embodiment of the present invention.

FIG. 14 shows the display device similar to that in FIG. 11. However, in FIG. 14, the film type polarizer 16 is adhered to a glass plate 46, and the glass plate 46 is arranged to face the light source 12. By this arrangement, it is possible to prevent expansion and contraction of the film due to a thermal cycle depending on switching on and off of the light source 12 and to prevent a change in polarizing characteristics due to a change in index of refraction depending on expansion and contraction of the film. In addition, by arranging the glass plate 46 to face the light source 12, the surface of the film on the side of the light source 12 becomes flat, so it is possible to reduce a diffused reflection on that surface to thereby increase the efficiency of the available light.

Figure 15:
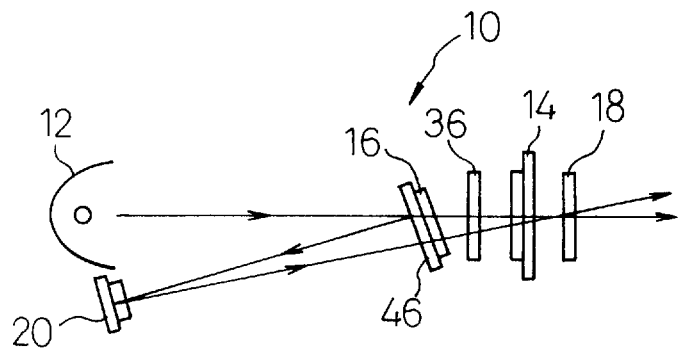
FIG. 15 is a diagrammatic view of a display device according to a further embodiment of the present invention.

In FIG. 15, the polarization rotating film 22 is adhered to the surface of the mirror 20 which reflects the polarized light which is reflected by the polarizer 16. Since the polarization rotating film 22 of FIG. 14 contacts air, the polarized light is made incident from air to the polarization rotating film 22, from the polarization rotating film 22 to air, from air to the polarization rotating film 22, and from the polarization rotating film 22 to air, while the polarized light reciprocatingly travels. The amount of the light is reduced to some degree each time the light is made incident and emerges due to a surface reflection, and the amount of the light is reduced four times in the arrangement of FIG. 14. According to the arrangement of FIG. 15, it is possible to avoid the reduction of the amount of the light as much as possible. For the same purpose, it is possible to adhere polarization rotating film 22 to the glass plate to which the polarizer 16 is adhered.

Figure 16:
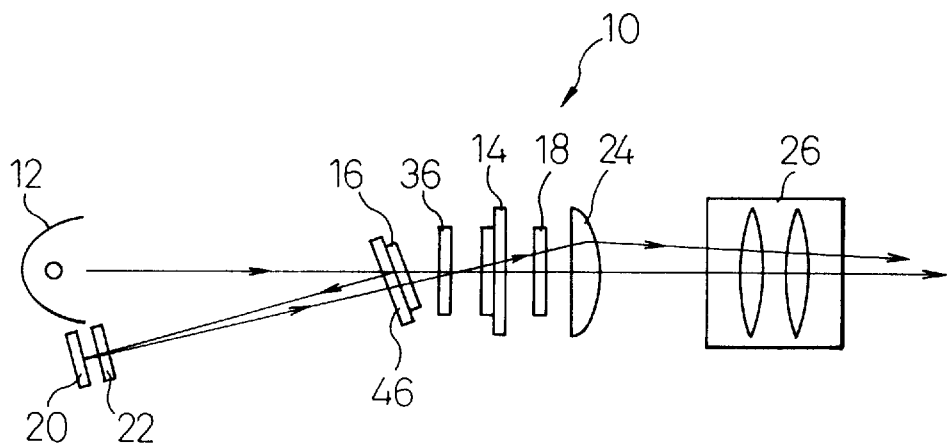
FIG. 16 is a diagrammatic view of a display device according to a further embodiment of the present invention.

In FIG. 16, an example is shown in which the condenser lens 24 is arranged between the analyzer 18 and the projection lens 26. In this arrangement too, all the light is converged at the projection lens 26 by the condenser lens 24.

Figure 17:
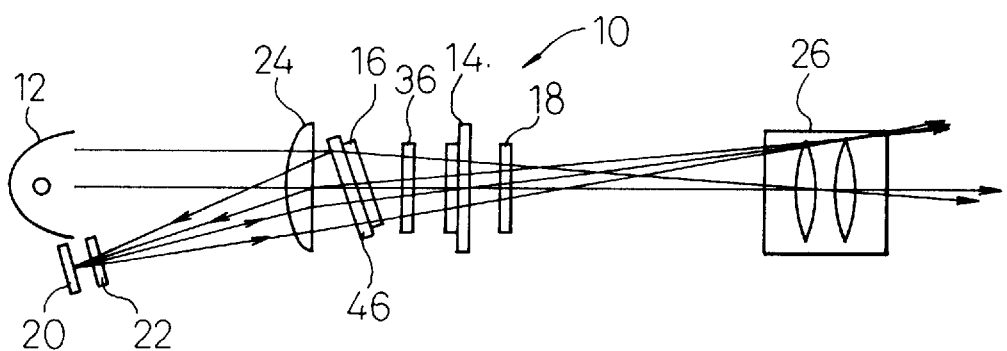
FIG. 17 is a diagrammatic view of a display device according to a further embodiment of the present invention.

In FIG. 17, an example is shown in which the condenser lens 24 is arranged between the light source 12 and the analyzer 18. The condenser lens 24 causes the light which is reflected by the polarizer 16 to the mirror 20. The mirror 20 is arranged such that the light from the polarizer 16 is made incident to the mirror 20, not vertical to the mirror 20, but at an angle to the mirror 20, so that a phenomena that the polarized light reflected by the mirror and passes through the polarizer 16 is displaced from the projection lens 26 to the greater extent is avoided. The condenser lens 24 also has a function to make the polarized light passing through the polarizer 16 and the liquid crystal panel 14 convergent at the projection lens 26.

Figure 18:
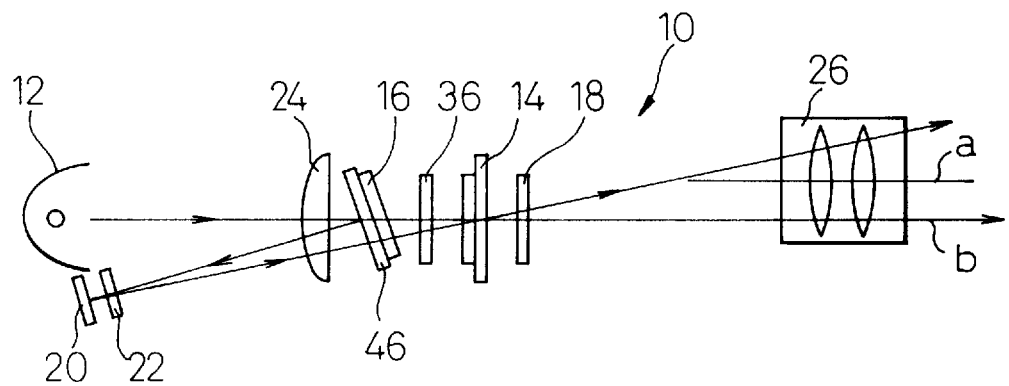
FIG. 18 is a diagrammatic view of a display device according to a further embodiment of the present invention.

In FIG. 18, the optical axis "a" of the projection lens 26 is offset from the optical axis "b" passing through the light source 12 and the liquid crystal panel 14. The offsetting direction is on opposite side of the optical axis "b" from the mirror 20. By this arrangement, it is possible to efficiently introduce the polarized light initially passing through the polarizer 16 and the polarized light which is initially reflected by the polarizer 16, is reflected by the mirror 20 and passes through the polarizer 16. Therefore, it is not necessary to shorten the focal length of the projection lens 26 and to enlarge the entrance pupil, and it is advantageous in reducing the manufacturing cost of the display device.

Figure 19:
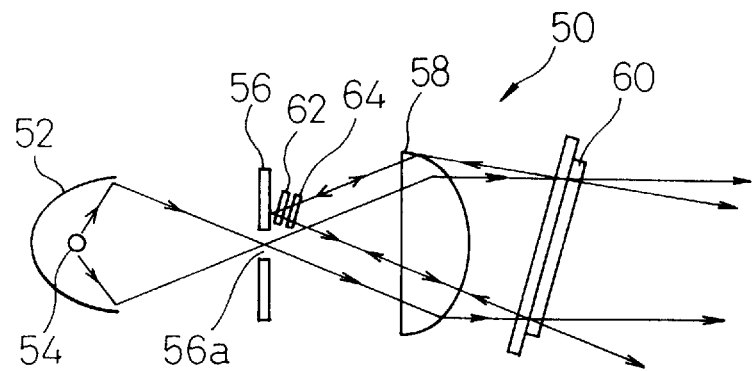
FIG. 19 is a diagrammatic view of a polarized light source according to a further embodiment of the present invention.

FIG. 19 shows the polarized light source 50 according to a further embodiment of the present invention. It will be apparent that the polarized light source 50 can be used as part of the display device 10 or of the display device 100.

In FIG. 19, the polarized light source 50 comprises an elliptic reflector 52, a lamp 54, a pin-hole plate 56 for controlling parallelism of a light, a field lens 58 for converting a divergent light into a parallel light, a reflective type polarizer 60, a mirror 62 and a polarization rotating film 64. The lamp 54 can be one emitting a considerably bright light, such as a metal halide lamp, a halogen lamp, or a xenon lamp.

The lamp is arranged at one of the focal points of the elliptic reflector 52, so the light is converged at the other focal point of the elliptic reflector 52 after the light is reflected by the reflector 52, and then diverged. The pin-hole 56*a* of the pin-hole plate 56 is arranged at the other focal point of the elliptic reflector 52 so as to restrict the convergent light to control the amount of the dispersed light. The field lens 58 has a focal point at the pin-hole plate 56 to convert the divergent light from pin-hole plate 56 into the parallel light.

The polarizer 60 allows a portion of the polarized light to pass therethrough and another portion of the polarized light to be reflected thereby, and is inclined to the optical axis determined by the field lens 58 and the pin-hole plate 56, similar to the polarizer 16 in the above described embodiments. The mirror 62 is arranged between the field lens 58 and the pin-hole plate 56 at such a position that the light emerging from the pin-hole plate 56 is not obstructed, and the polarized light reflected by the polarizer 60 is converged at the mirror 62 arranged adjacent to the pin-hole 56*a* of the pin-hole plate 56. The mirror 62 is arranged vertical to the optical axis of the polarized light reflected by the polarizer 60 so that the reflected polarized light is again made incident to the field lens 58. The polarization rotating film 64 is arranged between the mirror 62 and the field lens, so that the vibrating direction of the polarized light is rotated with 90 degrees while the polarized light reciprocates, similar to the above described polarization rotating film 22.

In the operation of the polarized light source 50, the light emitting from the lamp 54 located at one of the focal points of the reflector 52 is reflected by the reflector 52 and is condensed at the other focal point of the reflector 52. The light which is not condensed is cut off by the pin-hole plate 56 and the light which passes through the pin-hole plate 56 goes toward the field lens 58. The field lens 58 converts the divergent light from the pin-hole plate 56 into the parallel light. The light then travels to the polarizer 60, with the result that a portion of the polarized light passes through the polarizer 60 and another portion of the polarized light is reflected by the polarizer 60. The light which is reflected by the polarizer 60 travels to the mirror 62 through the field lens 58 and the polarization rotating film 64, is reflected by the mirror 62, and travels again to the polarizer 60 through the polarization rotating film 64 and the field lens 58. Since the vibrating direction of this polarized light is rotated by 90 degrees, the polarized light can pass through the polarizer 60. In this manner, it is possible to provide a parallel polarized light from almost all the light emitting from the lamp 54.

Figure 20:
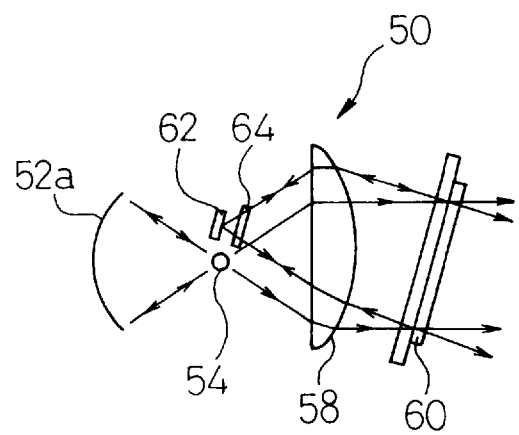
FIG. 20 is a diagrammatic view of a polarized light source according to a further embodiment of the present invention.

FIG. 20 shows the polarized light source 50 according to a further embodiment of the present invention. The polarized light source 50 comprises a spherical reflector 52*a*, a lamp 54, a field lens 58 for converting a divergent light into a parallel light, a reflective type polarizer 60, a mirror 62 and a polarization rotating film 64. The lamp 54 is arranged at the focal point of the spherical reflector 52*a*. A portion of the light emitting from the lamp 54 travels to the field lens 58, and another portion of the light emitting from the lamp 54 and reflected by the reflector 52*a* is condensed at the focal point, that is, at the lamp 54, and travels to the field lens 58. The field lens 58 has a focal point at the lamp 54, and converts the divergent light emitting from the lamp 54 into a parallel light.

The polarizer 60 allows a portion of the polarized light to pass therethrough and another portion of the polarized light to be reflected thereby, and is inclined to the optical axis determined by the spherical reflector 52*a* and the field lens 58, similar to the polarizer 16 in the above described embodiments. The mirror 62 is arranged between the field lens 58 and the lamp at such a position that the polarized light reflected by the polarizer 60 is converged at the mirror 62 through the field lens 58. The mirror 62 is arranged vertical to the optical axis of the polarized light reflected by the polarizer 60 so that the reflected polarized light is again made incident to the field lens 58. The polarization rotating film 64 is arranged so that the vibrating direction of the polarized light is rotated with 90 degrees while the polarized light reciprocates, similar to the above described polarization rotating film 22. Therefore, in this embodiment too, it is possible to provide a parallel polarized light from almost all the light emitting from the lamp 54.

Figure 21:
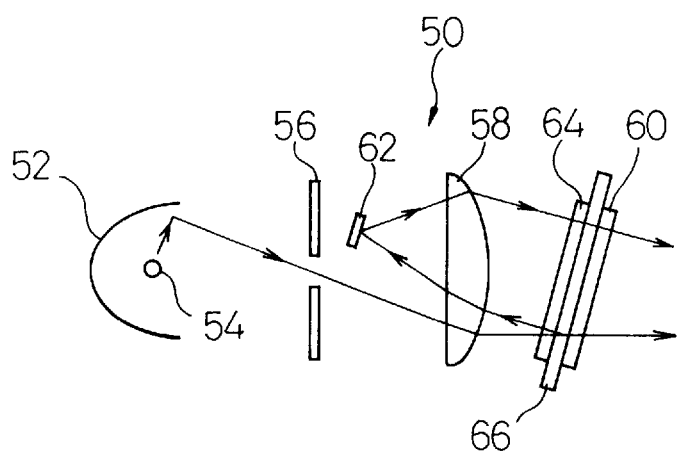
FIG. 21 is a diagrammatic view of a polarized light source according to a further embodiment of the present invention.

FIG. 21 shows a further embodiment of the polarized light source, modified from that of FIG. 21. In this embodiment, the position of the polarization rotating film 64 is changed from that of FIG. 19. The polarization rotating film 64 is arranged on the light emerging side of the field lens. That is, the polarizer 60 is adhered to one surface of a glass plate 66, and the polarization rotating film 64 is adhered to the other surface of the glass plate 66.

In this arrangement, the parallel light which passes through the field lens 58 can be made incident to the polarization rotating film 64, so the incident angle to the polarization rotating film 64 becomes substantially vertical, so it is possible to use a cheap polarization rotating film 64 in which an optical characteristics may vary depending on the incident angle.

Figure 22:
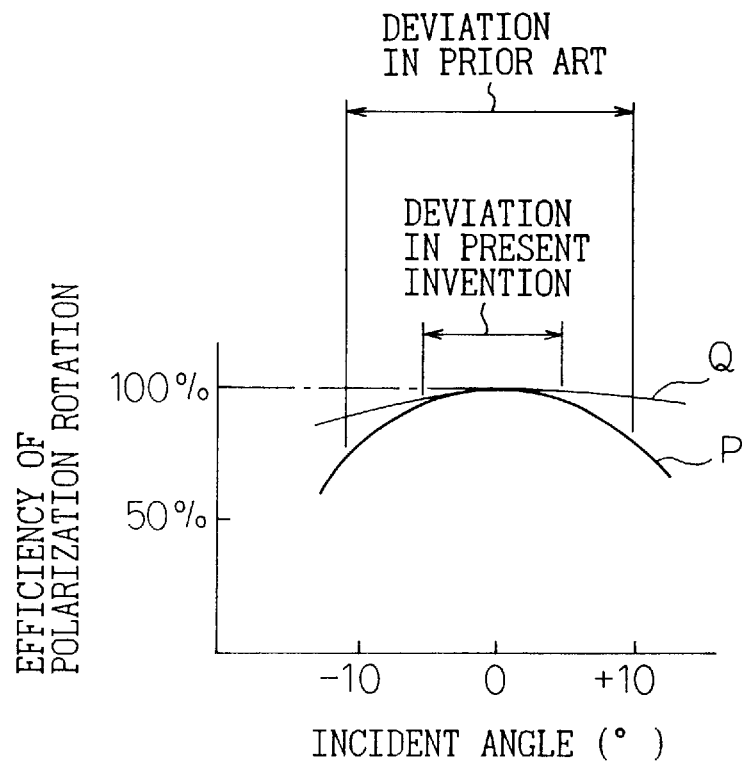
FIG. 22 is a view illustrating the efficiency of polarization rotation of the polarization rotating member of FIG. 21.

FIG. 22 shows the efficiency of polarization rotation of the polarization rotating film 64 of FIG. 21. The curve P shows the efficiency of polarization rotation when a cheap polarization rotating film 64 is used. The curve Q shows the efficiency of polarization rotation when an expensive polarization rotating film 64 is used. When an expensive polarization rotating film 64 is used, the deviation of the efficiency of polarization rotation depending on the incident angle is small. However, when a cheap polarization rotating film 64 is used, the efficiency of polarization rotation varies depending on the incident angle. Therefore, if the deviation of the incident angle becomes smaller, it is possible to use the polarization rotating film 64 within the range of a small deviation of the efficiency of polarization rotation even if the polarization rotating film 64 is cheap. This feature can be applied to the other embodiments.

Figure 23:
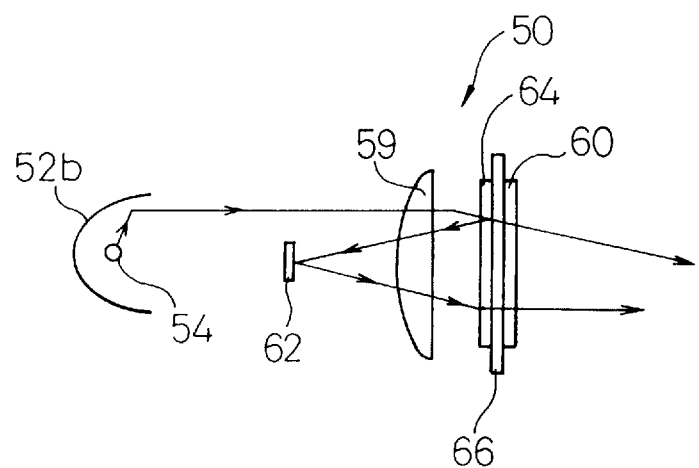
FIG. 23 is a diagrammatic view of a polarized light source according to a further embodiment of the present invention.

FIG. 23 shows the polarized light source 50 according to a further embodiment of the present invention. The polarized light source 50 comprises a parabolic reflector 52*b*, a lamp 54, a condenser lens 59 for condensing a parallel light, a reflective type polarizer 60, a mirror 62 and a polarization rotating film 64. The lamp 54 is arranged at the focal point of the parabolic reflector 52*a*, and the light reflected by the parabolic reflector 52*b* becomes a parallel light.

The polarizer 60 allows a portion of the polarized light to pass therethrough and another portion of the polarized light to be reflected thereby, and is arranged vertical to the optical axis determined by the parabolic reflector 52*b* and the condenser lens 59, similar to the polarizer 16 in the above described embodiments. The mirror 62 is arranged between the condenser lens 59 and the lamp 54 at a position within a path of the light reflected by the parabolic reflector 52*b*. The mirror 62 is arranged vertical to the optical axis of the polarized light reflected by the polarizer 60 so that the reflected polarized light is again made incident to the condenser lens 59. The polarization rotating film 64 is adhered to the other surface of the glass plate 66 to one surface of which the polarizer 60 is adhered. The polarization rotating film 64 is arranged so that the vibrating direction of the polarized light is rotated with 90 degrees while the polarized light reciprocates.

In the prior art light source using the parabolic reflector 52b, the lamp tube produces a shadow in the emitted light, and a dark portion appears at the central portion of the irradiated surface. To solve this problem, it is necessary to elongate the distance between the lamp and the reflector and between the lamp and the condenser lens. By using this embodiment of the polarized light source, it is possible not only to increase the efficiency of the available polarized light, but also to obtain a bright irradiation since it is possible to compensate for a shaded portion at the central area by the light reflected by the polarizer 60.

As explained in greater detail, according to the present invention, it is possible to provide a display device in which the light efficiency is high and the size of the display device is small. In addition, according to the present invention, it is possible to provide a polarized light source by which a parallel distributed polarized light is provided.

We claim:

1. A display device comprising:
   a light source;
   a light valve;
   a polarizer arranged between said light source and said light valve, said polarizer allowing a first polarized light to pass therethrough and a second polarized light to be reflected thereby;
   an analyzer arranged to receive a light passing through said light valve;
   at least one mirror arranged such that the second polarized light reflected by said polarizer is reflected to the polarizer by said at least one mirror;
   a polarization rotating element arranged between said polarizer and said at least one mirror;
   said polarizer being inclined to an optical axis passing through said light source and said light valve so that an angle between a light beam traveling from said light source to said polarizer and a light beam traveling from said polarizer to said at least one mirror is smaller than 90 degrees; and
   said at least one mirror being arranged on the side of said light source from a plane of said polarizer, whereby the first polarized light emitting from said light source to the polarizer can pass through said polarizer, and the second polarized light emitting from said light source and reflected by said polarizer is reflected by said at least one mirror to said polarizer, has a vibrating plane rotated by the polarization rotating element and can pass through said polarizer.

2. A display device according to claim 1, further comprising a projection lens.

3. A display device according to claim 1, wherein the light valve comprises a liquid crystal panel.

4. A display device according to claim 1, wherein the at least one mirror is arranged such that the polarized light reflected by the polarizer is made incident approximately perpendicular to the at least one mirror.

5. A display device according to claim 1, wherein the at least one mirror is arranged at a position outside a path of the light travelling from the light source to the polarizer and adjacent to the light source.

6. A display device according to claim 1, wherein the at least one mirror is arranged at a position within a path of the light travelling from the light source to the polarizer.

7. A display device according to claim 1, wherein the polarizer has a flat reflecting surface.

8. A display device according to claim 1, wherein the polarizer has a curved reflecting surface.

9. A display device according to claim 8, wherein the curved reflecting surface of the polarizer comprises a convex surface, viewed from the side of the light source.

10. A display device according to claim 8, wherein the curved reflecting surface of the polarizer comprises a concave surface, viewed from the side of the light source.

11. A display device according to claim 8, wherein the curved reflecting surface of the polarizer comprises first and second portions arranged symmetrically with respect a central point of the curved reflecting surface or with respect to a line passing through the central point, and the at least one mirror comprises two mirrors corresponding to the first and second portions.

12. A display device according to claim 1, further comprising a lens causing the light travelling from the polarizer to the at least one mirror to converge.

13. A display device according to claim 2, further comprising a lens causing the light travelling from the polarizer to the at least one mirror to converge and causing the light passing through the polarizer to the projection lens to converge.

14. A display device according to claim 2, further comprising a first lens causing the light travelling from the polarizer to the at least one mirror to converge and a second lens causing the light travelling passing through the polarizer to the projection lens to converge.

15. A display device according to claim 1, further comprising a further polarizer arranged between the polarizer and the light valve for permitting a polarized light having the same vibrating direction as that of the polarized light passing through the first polarizer to pass through the further polarizer and causing a polarized light having a vibrating direction perpendicular to that of the polarized light passing through the first polarizer to be reflected by the further polarizer.

16. A display device according to claim 1, wherein the polarizer comprises one of a first film and a second film, said first film including a laminated structure of a film having selective reflectivity of a circular polarized light and phase films converting a right or left rotating circular polarized light into a linear polarized light, said second film including films defining small prisms on surfaces thereof said small prisms having surfaces laminated with a thin film, wherein different surfaces of said small prisms have thin films with different indices of refraction.

17. A display device according to claim 1, wherein the polarizer is adhered to a glass plate and the glass plate is arranged to face the light source.

18. A display device according to claim 17, wherein the polarization rotating element is adhered to the reverse surface of the glass plate.

19. A display device according to claim 1, wherein the polarization rotating element is adhered to the at least one mirror.

20. A display device according to claim 2, wherein the at least one mirror comprises one mirror, and the projection lens has an optical axis which is offset relative to the optical axis passing through the light source and the light valve on the opposite side of the mirror.

21. A projection type display device comprising:
    a light source;
    a plurality of light valves;
    a plurality of polarizers arranged between the light source and the respective light valves, each of the polarizers allowing a first polarized light to pass therethrough and a second polarized light to be reflected thereby;

a plurality of analyzers arranged to receive a light passing through the respective light valves;

at least one mirror arranged such that the second polarized light reflected by the plurality of polarizers is reflected to the original polarizers by the at least one mirror;

at least one polarization rotating element arranged between the polarizers and the at least one mirror, the number of the at least one polarization rotating element being identical to that of the at least one mirror;

a projection lens;

the polarizers being inclined to an optical axis passing through the light source and the light valves so that an angle between a light beam traveling from the light source to the polarizers and a light beam traveling from the polarizers to the at least one mirror is smaller than 90 degrees; and the at least one mirror is arranged near the light source, whereby the first polarized light emitting from the light source to the polarizers can pass through the polarizers, and the second polarized light emitting from the light source to the polarizers and reflected by the polarizers is reflected by the at least one mirror to the polarizers, has a vibrating plane rotated by the at least one polarization rotating element and can pass through the polarizers.

22. A polarized light source comprising:

an elliptic reflector having two focal points;

a lamp arranged at one of the focal points of the elliptic reflector;

a pin-hole plate having a pin-hole and arranged at the other of the focal points of the elliptic reflector;

a field lens having a focal point at the other focal point of the elliptic reflector;

a polarizer arranged on the light emerging side of the field lens and inclined to an optical axis determined by the elliptic reflector and the pin-hole plate, the polarizer allowing a first polarized light to pass therethrough and a second polarized light to be reflected thereby;

a mirror arranged between the field lens and the pin-hole plate at a position near the pin-hole; and a polarization rotating element arranged between the mirror and the polarizer.

23. A polarized light source comprising:

a spherical reflector having a focal point;

a lamp arranged at the focal point of the spherical reflector;

a field lens having a focal point at a position of the lamp;

a polarizer arranged on the light emerging side of the field lens and inclined to an optical axis determined by the lamp and the field lens, the polarizer allowing a first polarized light to pass therethrough and a second polarized light to be reflected thereby;

a mirror arranged at a position near the lamp; and a polarization rotating element arranged between the mirror and the polarizer.

24. A polarized light source comprising:

a parabolic reflector having a focal point;

a lamp arranged at the focal point of the parabolic reflector;

a condenser lens;

a polarizer arranged on the light emerging side of the condenser lens and vertical to an optical axis determined by the lamp and the condenser lens, the polarizer allowing a first polarized light to pass therethrough and a second polarized light to be reflected thereby;

a mirror arranged between the lamp and the condenser lens on the optical axis; and a polarization rotating element arranged between the mirror and the polarizer.

25. A projection type display device including a polarized light source according to one of claims 22 to 24.

* * * * *

UNITED STATES PATENT AND TRADEMARK OFFICE
CERTIFICATE OF CORRECTION

PATENT NO. : 5,826,960
DATED : October 27, 1998
INVENTOR(S) : Gotoh et al.

It is certified that error appears in the above-identified patent and that said Letters Patent is hereby corrected as shown below:

On the title page: Item [54] and Column 1, line 3, delete "PROTECTION" and insert --PROJECTION-- therefor Signed and Sealed this Fourteenth Day of September, 1999

Attest:

Q. TODD DICKINSON

*Attesting Officer*     *Acting Commissioner of Patents and Trademarks*